US006962302B2

(12) United States Patent
Cheng

(10) Patent No.: US 6,962,302 B2
(45) Date of Patent: Nov. 8, 2005

(54) COMBINATION OF PEPPER MILL AND SALT MILL

(76) Inventor: Shun-I Cheng, No. 174, Tsou-Kong Street, Yeuong-Kang City, Tainan Hsieh (TW)

( * ) Notice: Subject to any disclaimer, the term of this patent is extended or adjusted under 35 U.S.C. 154(b) by 64 days.

(21) Appl. No.: 10/683,699

(22) Filed: Oct. 14, 2003

(65) Prior Publication Data

US 2005/0077405 A1    Apr. 14, 2005

(51) Int. Cl.[7] .............................................. A47J 42/04
(52) U.S. Cl. .................................................. 241/169.1
(58) Field of Search .............................. 241/168, 169.1

(56) References Cited

U.S. PATENT DOCUMENTS 3,827,641 A * 8/1974 Andersson ............. 241/101.01
4,925,150 A * 5/1990 Tedioli ..................... 241/169.1
6,561,447 B2 * 5/2003 Wu .......................... 241/169.1

* cited by examiner

Primary Examiner—Mark Rosenbaum
(74) Attorney, Agent, or Firm—Rosenberg, Klein & Lee

(57) ABSTRACT

A combination of a pepper mill and salt mill includes a mediate member having two recesses defined in two ends thereof and two connection members are rotatably engaged with the two recesses. Each recess has first notches defined in an inside thereof and each connection member has second notches which are located in alignment with the first notches so that beads are moveably received in the space and closed by the first notches and the second notches. Two mill members are respectively connected to the connection members. When the combination is put upright, the beads on the upper end of the mediate member are located at the joint surface of the upper mill member and the connection member, and the beads on the lower end of the mediate member are received in first notches such that only the mill member on the lower end can be rotated.

3 Claims, 5 Drawing Sheets

COMBINATION OF PEPPER MILL AND SALT MILL

FIELD OF THE INVENTION

The present invention relates to a combination of pepper mill and salt mill. The pepper and salt mill are located on two opposite ends of the combination and only one can be is operated when the combination is oriented upright.

BACKGROUND OF THE INVENTION

Pepper mill and salt mill are two separated items on table and the user picks either one of them to season the soup or the food. The conventional pepper mill has to be operated by holding it by one hand and rotating a rotatable part by the other hand. The conventional salt mill needs only one hand to operate. Nevertheless, in order to have fresh flavor of pepper and salt, the pepper and salt are required to be ground using the pepper mill as mentioned above. Therefore, the user has to put the pepper mill or the salt mill down and take the salt mill or the pepper mill. This takes time and is inconvenient for the users. If the table has a small top, the pepper mill and salt mill occupy two much space while they are necessary for the users.

The present invention intends to provide a combination of a pepper mill and salt mill so as to occupy less space on the table and is convenient for the user to operate the pepper mill and the salt mill.

SUMMARY OF THE INVENTION

In accordance with one aspect of the present invention, there is provided a combination of a pepper mill and salt mill and the combination comprises a mediate member having a two recesses defined in two ends thereof and a protrusion extends from an inside of each of the two recesses so that two connection members are respectively and rotatably mounted to the protrusions. A polygonal passage is defined through each of the protrusions. A plurality of first notches are defined in the inside of each recess.

Each connection member has a plurality of second notches defined in a side thereof and located in alignment with the first notches. A bead is movably received in a space enclosed by the aligned first notch and second notch. A depth of each of the first notches is defined such that the bead is partially received in the fist notches and the bead is located at a joint surface of the connection member and the mediate member. A depth of each of the second notches is defined such that the bead is completely received in the second notch.

Two mill members each have a chamber defined therein and a polygonal driving shaft is connected in each mill member so as to drive a grinding piece. The two mill members are respectively rotatably installed in the two recesses of the mediate member and secured to the two connection member in the two recesses. The two driving shafts are respectively engaged with the polygonal passages in the protrusions in the two recesses.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
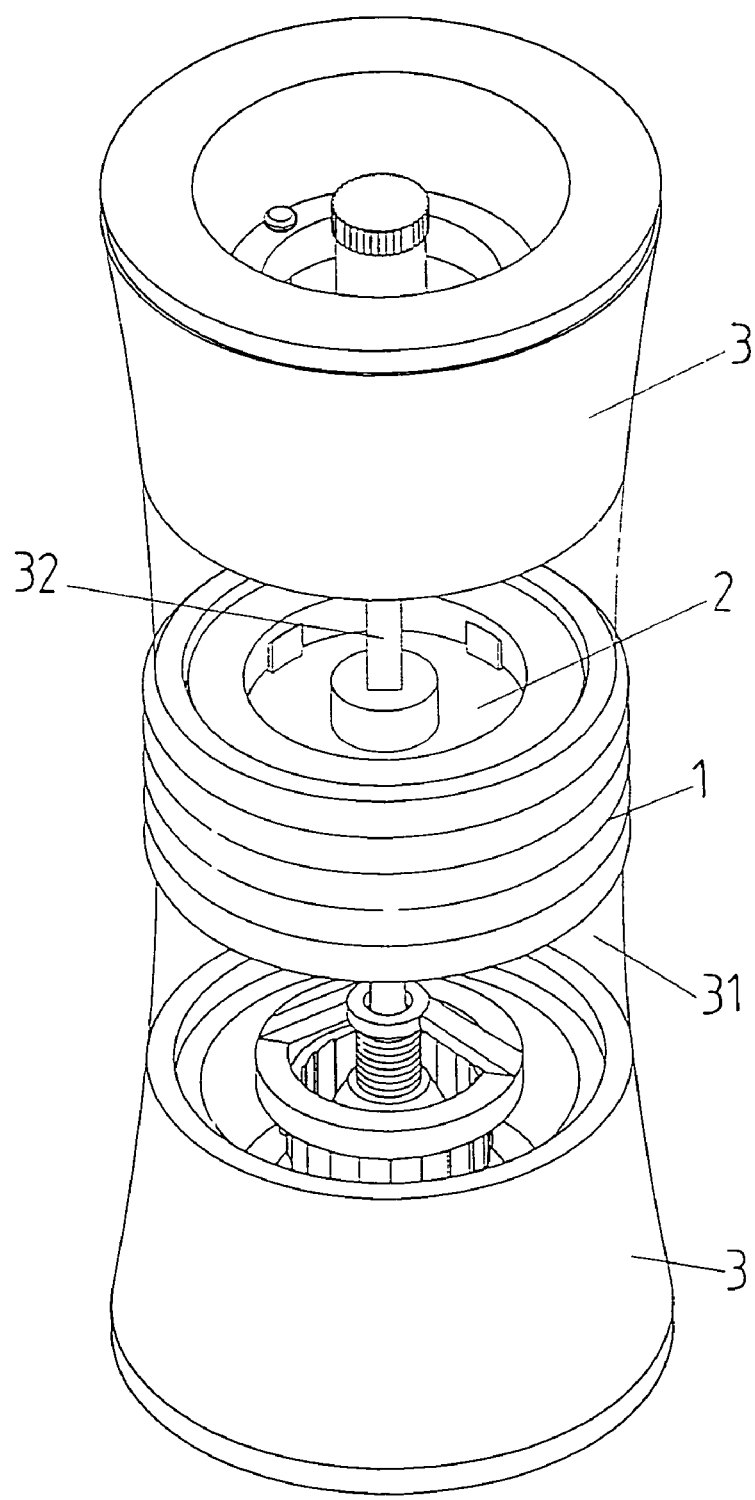
FIG. 1 is a perspective view to show the combination of the present invention.
Figure 2:
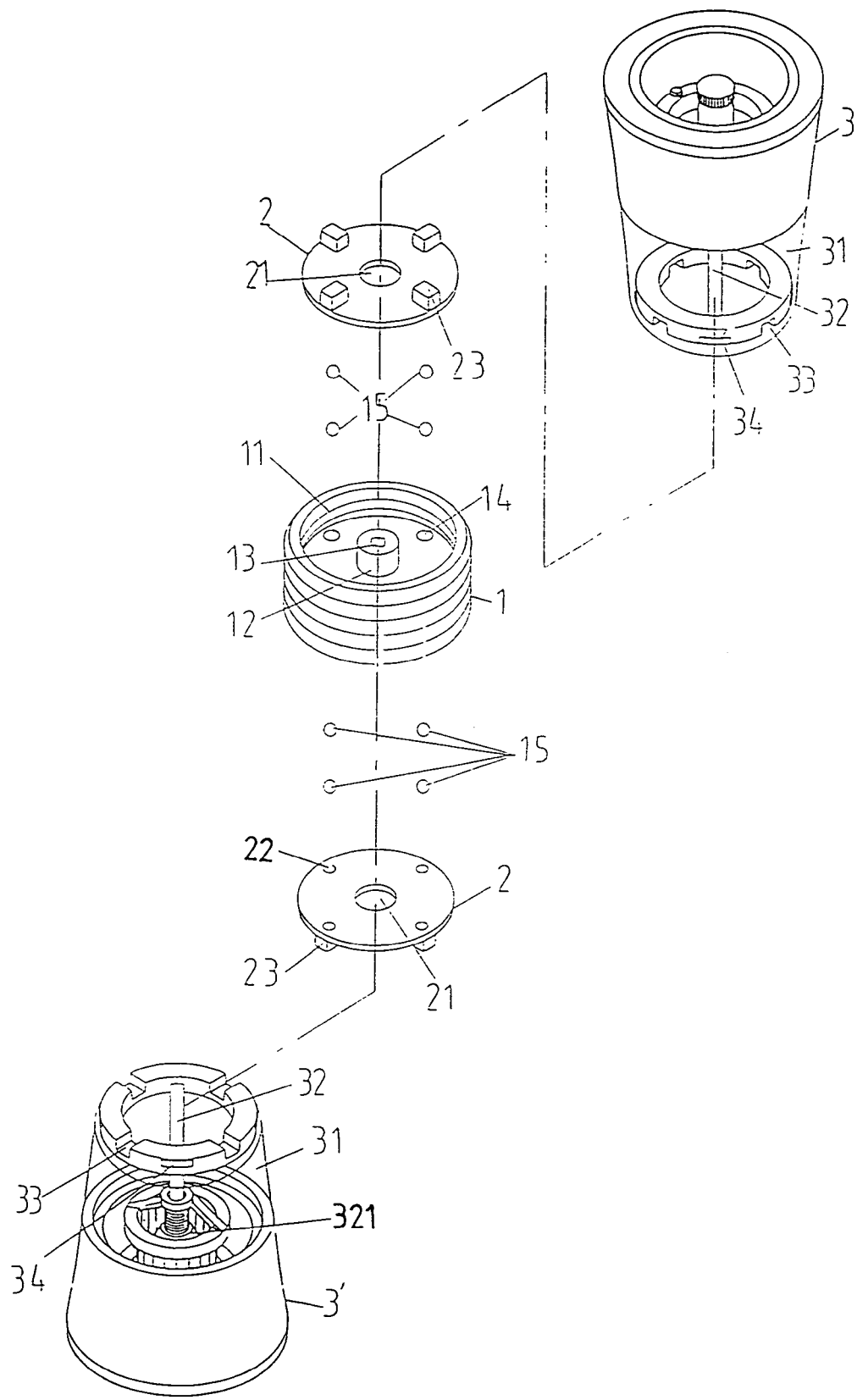
FIG. 2 is an exploded view to show the combination of the present invention.
Figure 3:
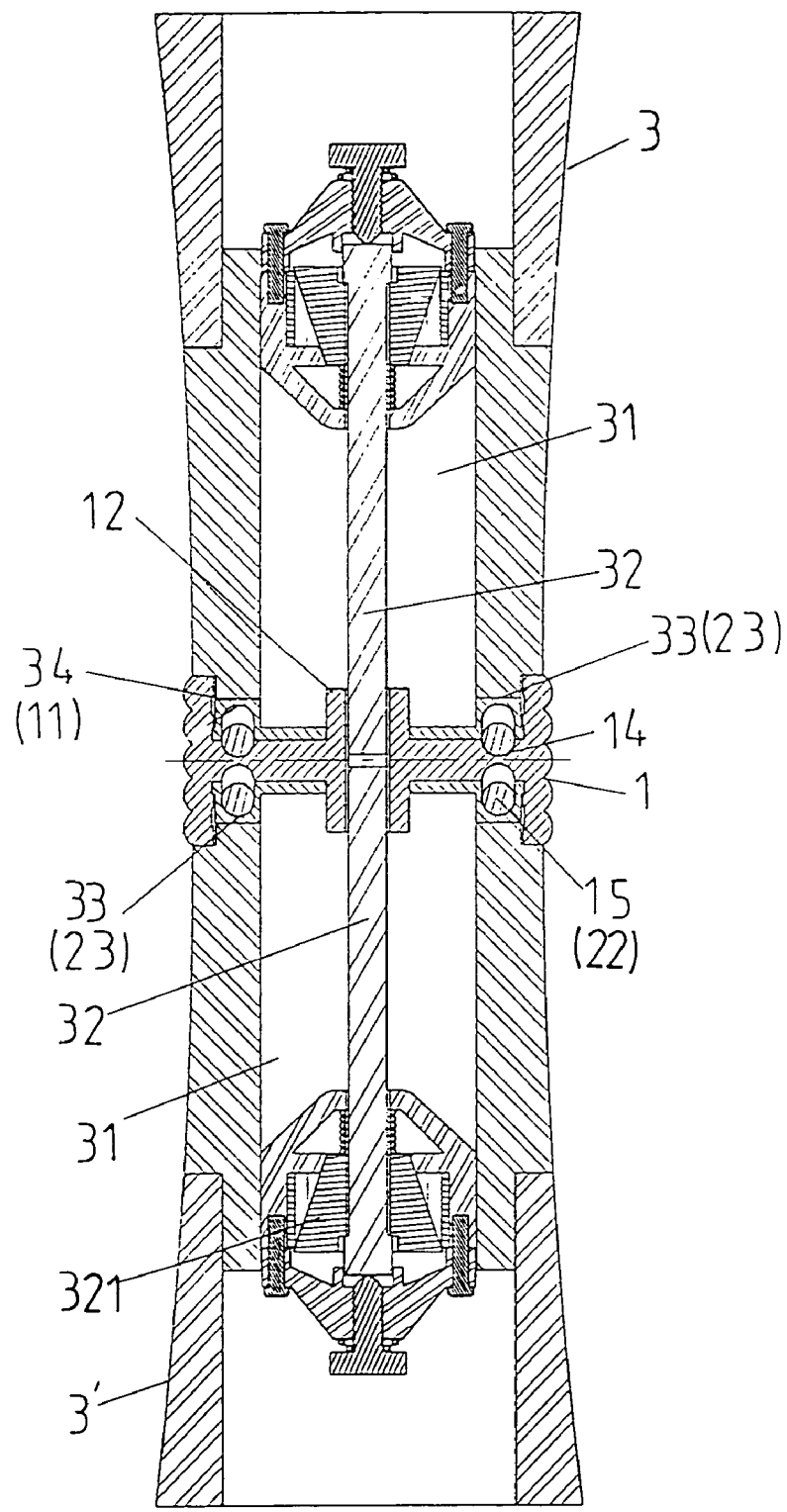
FIG. 3 is a cross sectional view to show the combination is put upright.

Referring to FIGS. 1 to 3, the combination of the present invention comprises a mediate member 1 which has two recesses defined in two ends of the mediate member 1 respectively and a protrusion 12 extends from an inside of each of the two recesses. A polygonal passage 13 is defined through each of the protrusions 12 and a plurality of first notches 14 are defined in the inside of each recess. An inside of a wall enclosing each of the two recesses of the mediate member 1 includes a groove 11 defined therein.

Two connection members 2 each have a hole 21 defined therethrough and are respectively received in the two recesses. The two protrusions 12 extend through the holes 21 so that the two connection members 2 are rotatable about the protrusions 12. A plurality of second notches 22 are defined in a side of each connection member 2 and located in alignment with the first notches 14. A bead 15 is movably received in a space enclosed by the aligned first notch 14 and second notch 22. A depth of each of the first notches 14 is defined such that the bead 15 is partially received in the fist notches 14 and the bead 15 is located at a joint surface of the connection member 2 and the mediate member 1 as shown in FIG. 3. A depth of each of the second notches 22 is defined such that the bead 15 is completely received in the second notch 22 as shown in FIG. 3. Each of the connection member 2 has blocks 23 extending from the other side thereof.

Two mill members 3, 3' each have a chamber 31 defined therein and a polygonal driving shaft 32 connected in each mill member 3 so as to drive a grinding piece 321. The two mill members 3, 3' each have engaging recesses 33 with which the blocks 23 are engaged. The two mill members 3, 3' are respectively rotatably installed in the two recesses of the mediate member 1 and the two driving shafts 32 are respectively engaged with the polygonal passages 13 in the protrusions 12 in the two recesses. Each of the mill members 3, 3' has rail members 34 on an outer periphery thereof and the rail members 34 are movably engaged with the groove 11.

Figure 4:
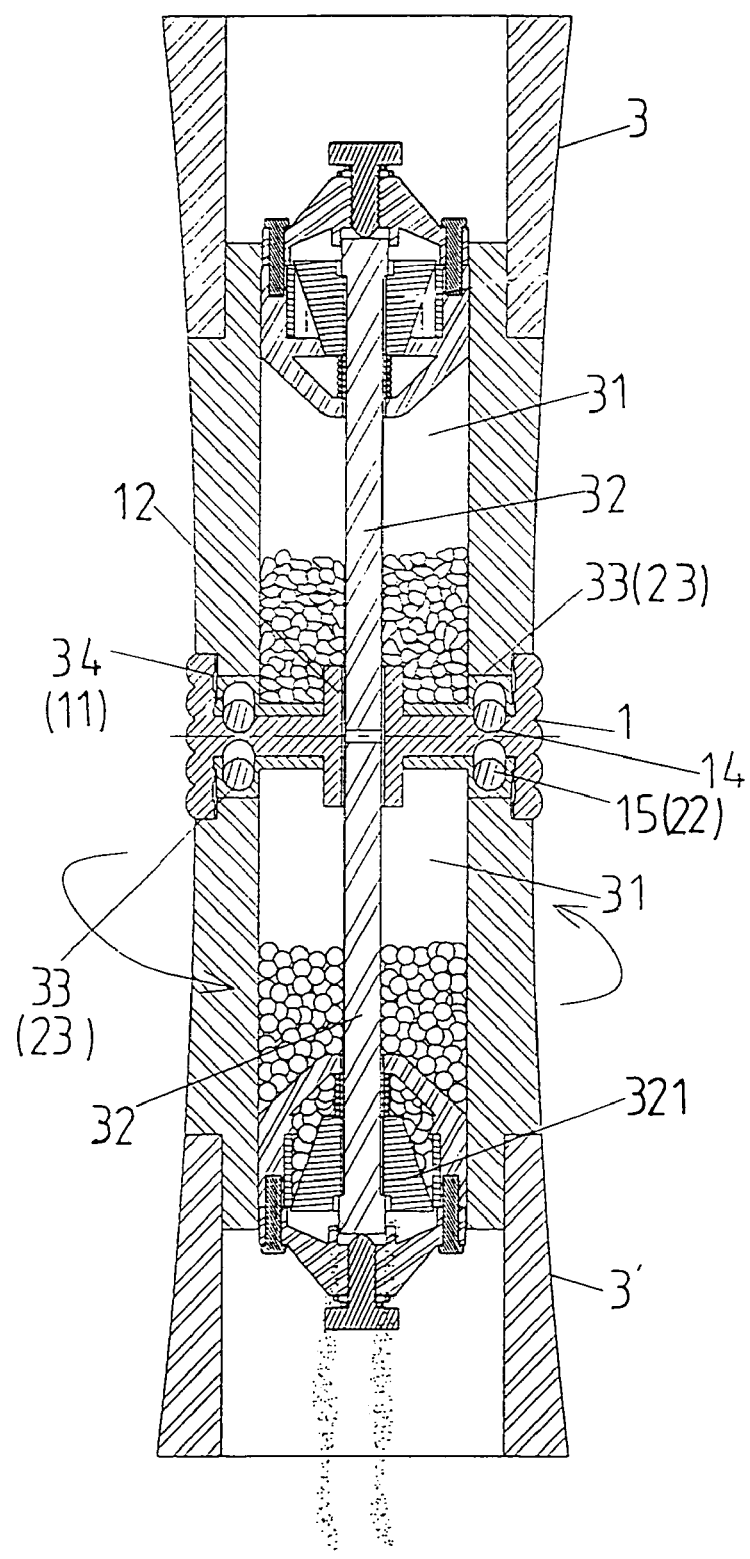
FIG. 4 is a cross sectional view to show the combination is put upright with the first mill member located at a top end of the combination.
Figure 5:
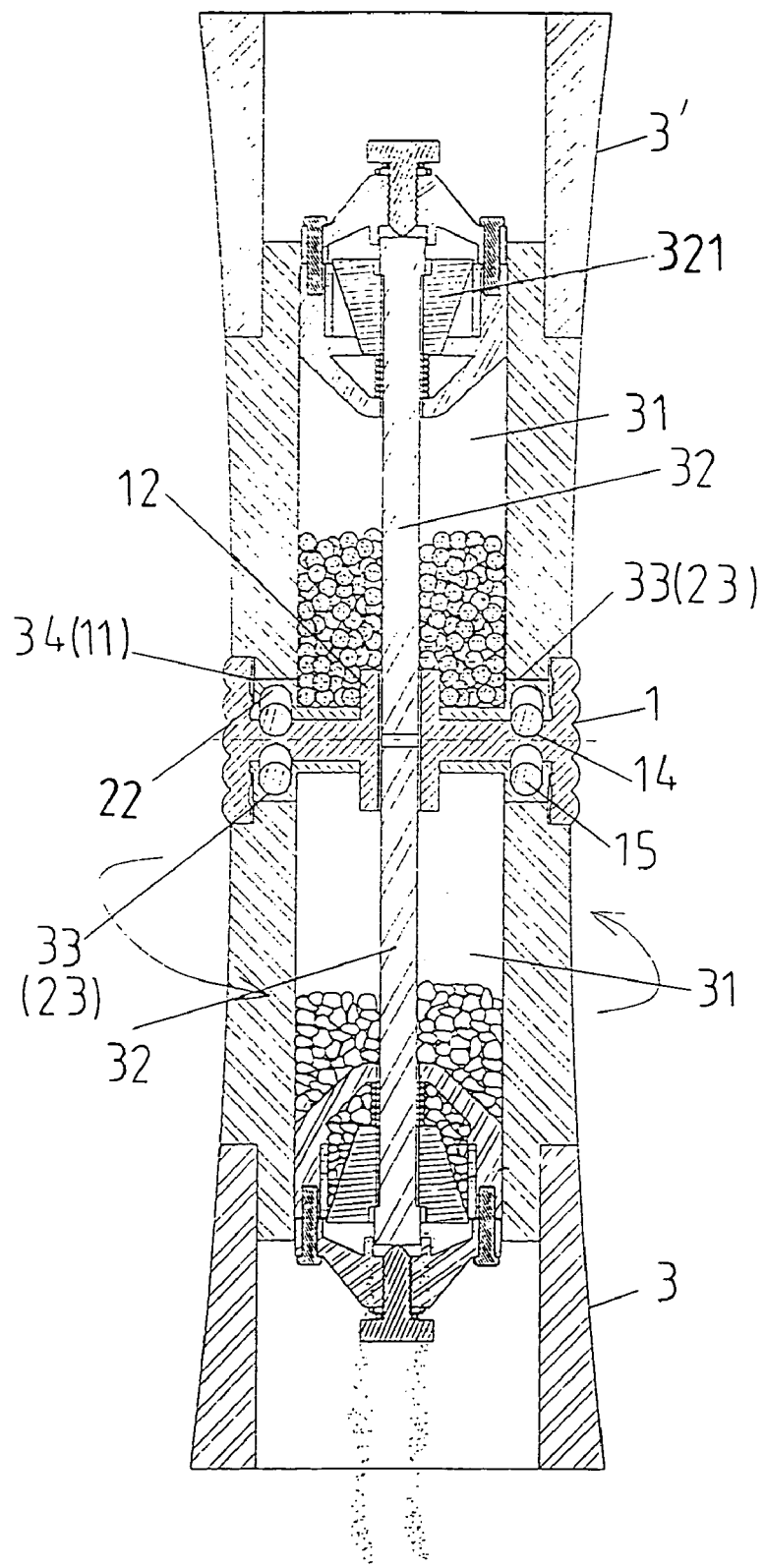
FIG. 5 is a cross sectional view to show the combination is put upright with the second mill member located at a top end of the combination.

As shown in FIG. 4, when the combination is put upright with the mill member 3 located at the top end of the combination, the beads 15 limit the rotation of the mill member 3, while the mill member 3' on the lower end of the combination is allowed to be rotated. As shown in FIG. 5, when the mill member 3' is located at the top end of the combination and the mill member 3 is located at the lower end of the combination, the mill member 3' cannot be rotated and the mill member 3 is rotatable.

Therefore, the two mill members 3, 3' cam be combined to be a one-piece can and pepper and salt are to be received in the two mill members 3, 3' respectively so that the user may use both of the pepper and salt without exchanging different cans.

While we have shown and described the embodiment in accordance with the present invention, it should be clear to those skilled in the art that further embodiments may be made without departing from the scope of the present invention.

What is claimed is:

1. A combination of pepper mill and salt mill, comprising:
a mediate member having two recesses defined in two ends of the mediate member respectively, a protrusion extending from an inside of each of the two recesses and a polygonal passage defined through each of the protrusions, a plurality of first notches defined in the inside of each recess;

two connection members respectively received in the two recesses, each connection member having a hole through which the protrusion corresponding thereto extends, a plurality of second notches defined in a side of each connection member and located in alignment with the first notches, a bead movably received in a space enclosed by each of the aligned first and second notches, a depth of each of the first notches being defined such that the beads are partially received in the fist notches, the beads located at a joint surface of the connection member and the mediate member when the beads are partially received in the first notches, a depth of each of the second notches being defined such that the beads are completely received in the second notch, the beads located away from the joint surface of the connection member and the mediate member when the beads are completely received in the second notches, and two mill members each having a chamber defined therein and a polygonal driving shaft connected in each mill member so as to drive a grinding piece, the two mill members respectively rotatably installed in the two recesses of the mediate member and secured to the two connection member in the two recesses, the two driving shafts respectively engaged with the polygonal passages in the protrusions in the two recesses.

2. The combination as claimed in claim 1, wherein each of the connection member has blocks extending from the other side thereof and each of the mill members has engaging recesses with which the blocks are engaged.

3. The combination as claimed in claim 1, wherein an inside of a wall enclosing each of the two recesses of the mediate member includes a groove defined therein and each of the mill members has rail members on an outer periphery thereof, the rail members being movably engaged with the groove.

* * * * *